United States Patent [19]
Seeley et al.

[11] Patent Number: 6,069,655
[45] Date of Patent: May 30, 2000

[54] ADVANCED VIDEO SECURITY SYSTEM

[75] Inventors: John E. Seeley, County of Bucks, Pa.; William R. Vogt, County of Morris, N.J.

[73] Assignee: Wells Fargo Alarm Services, Inc., King of Prussia, Pa.

[21] Appl. No.: 08/904,509

[22] Filed: Aug. 1, 1997

[51] Int. Cl.[7] .................................... H04N 7/18
[52] U.S. Cl. ............................................. 348/154
[58] Field of Search ................................. 348/159, 143, 348/152, 153, 154, 155; H04N 7/18

[56] References Cited

U.S. PATENT DOCUMENTS

| | | |
|---|---|---|
| 3,740,466 | 6/1973 | Marshall et al. . |
| 4,112,818 | 9/1978 | Garehime, Jr. . |
| 4,145,715 | 3/1979 | Clever . |
| 4,161,750 | 7/1979 | Kamin . |
| 4,257,063 | 3/1981 | Loughry et al. . |
| 4,342,987 | 8/1982 | Rossin . |
| 4,458,266 | 7/1984 | Mahoney . |
| 4,511,886 | 4/1985 | Rodriguez . |
| 4,651,143 | 3/1987 | Yamanaka . |
| 4,679,077 | 7/1987 | Yuasa et al. . |
| 4,725,818 | 2/1988 | Motyka et al. . |
| 4,772,945 | 9/1988 | Tagawa et al. . |
| 4,777,526 | 10/1988 | Saitoh et al. . |
| 4,857,912 | 8/1989 | Everett, Jr. et al. . |
| 4,922,339 | 5/1990 | Stout et al. . |
| 4,931,868 | 6/1990 | Kadar . |
| 4,962,473 | 10/1990 | Crain . |
| 5,091,780 | 2/1992 | Pomerleau . |
| 5,099,322 | 3/1992 | Gove . |
| 5,144,661 | 9/1992 | Shamosh et al. . |
| 5,187,352 | 2/1993 | Blair et al. . |
| 5,202,759 | 4/1993 | Laycock . |
| 5,229,850 | 7/1993 | Toyoshima ............................. 348/153 |
| 5,237,408 | 8/1993 | Blum et al. . |
| 5,239,459 | 8/1993 | Hunt et al. . |
| 5,283,551 | 2/1994 | Guscott . |
| 5,289,275 | 2/1994 | Ishii et al. . |
| 5,305,390 | 4/1994 | Frey et al. . |
| 5,398,057 | 3/1995 | Tapp . |
| 5,400,011 | 3/1995 | Sutton . |
| 5,455,561 | 10/1995 | Brown . |
| 5,508,736 | 4/1996 | Cooper . |
| 5,521,634 | 5/1996 | McGary ................................. 348/153 |
| 5,530,429 | 6/1996 | Hablov et al. . |
| 5,581,297 | 12/1996 | Koz et al. . |
| 5,602,585 | 2/1997 | Dickinson et al. . |
| 5,615,017 | 3/1997 | Choi ...................................... 386/109 |
| 5,623,249 | 4/1997 | Camire . |
| 5,629,981 | 5/1997 | Nerlikar . |
| 5,648,966 | 7/1997 | Kondo et al. . |
| 5,666,157 | 9/1997 | Aviv ...................................... 348/152 |
| 5,825,432 | 10/1998 | Yonezawa ............................. 348/153 |
| 5,870,471 | 2/1999 | Wootton ................................ 348/232 |
| 5,895,453 | 4/1999 | Cook ....................................... 705/22 |
| 5,923,364 | 7/1999 | Rhodes .................................. 348/159 |
| 5,926,209 | 7/1999 | Glatt ...................................... 348/143 |

*Primary Examiner*—Howard Britton
*Attorney, Agent, or Firm*—Polster, Lieder, Woodruff & Lucchesi L.C.

[57] ABSTRACT

A video security system (10) monitors a premise (F) to detect unwanted intrusions onto the premises. A plurality of cameras (22) located about the premise supply video images of scenes to a processor (12) located which processes the images to detection motion in a scene and classify the source of the motion. Only if the source is determined be one of a predetermined class of causes, is an indication provided to an alarm unit (16). The alarm unit, which is also connected to a plurality of conventional sensors (S1–S3) is responsive to the indication to cause the processor to transmit authenticated video images of the scene in which the motion is detected to a central station (CS). There, a video server (102), in conjunction with an alarm computer (104), enables the images to be displayed at a selected workstation (106) for viewing by an operator (O). Besides video, audio and relevant site data is also made available to the operator at the workstation. The operator's responsibility is to alert appropriate authorities. By not providing an indication of an intrusion unless the intrusion has been previously confirmed on-site, false and unwanted alarms are prevented without reducing but the probability of detecting an intrusion.

23 Claims, 10 Drawing Sheets

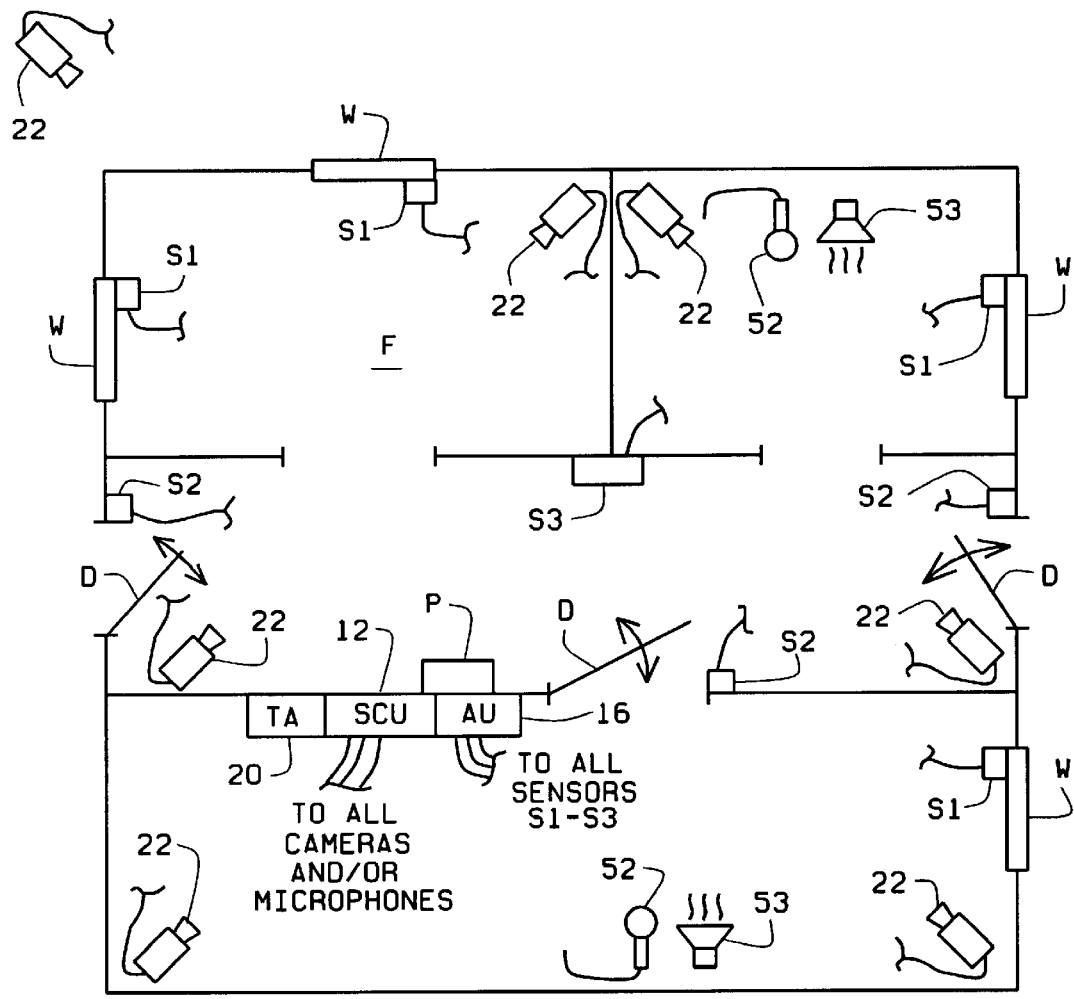
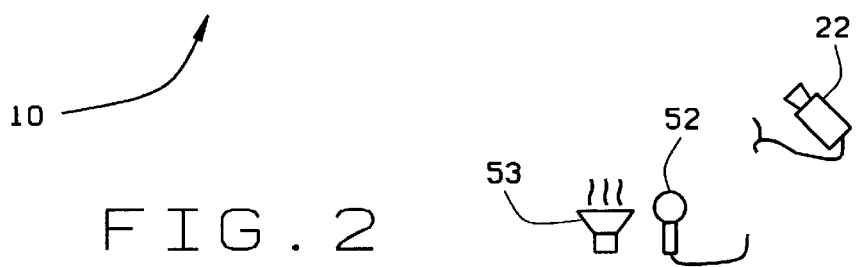

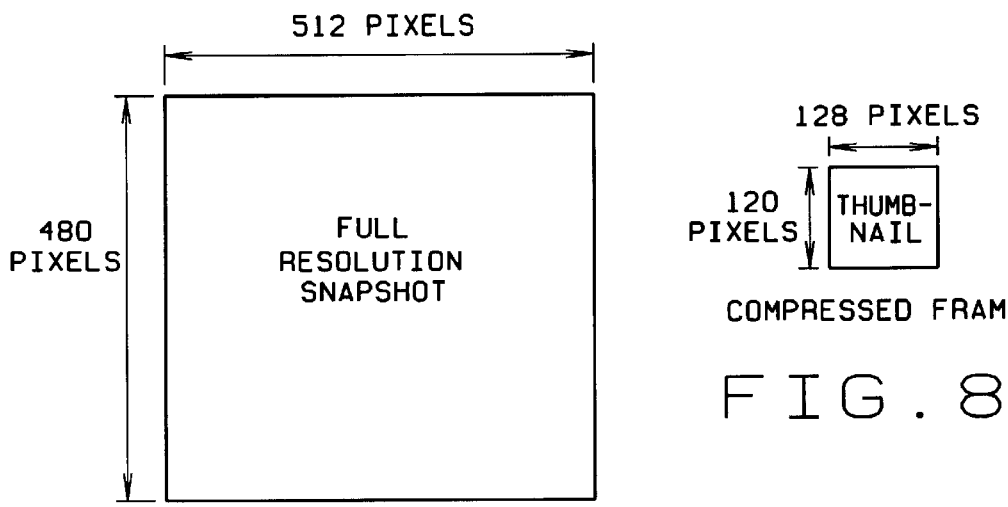
FIG. 8A
FIG. 8B
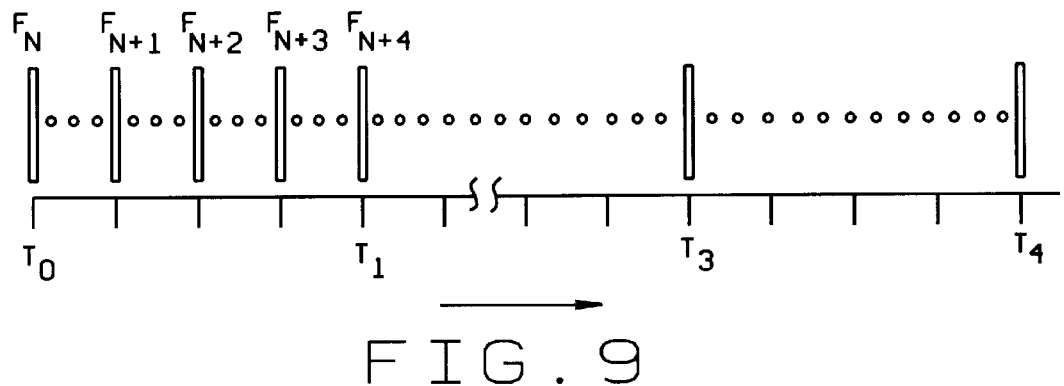
FIG. 9
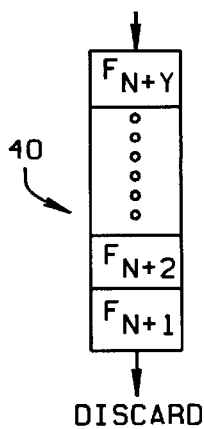
FIG. 10

ADVANCED VIDEO SECURITY SYSTEM

CROSS-REFERENCE TO RELATED APPLICATIONS

The subject matter contained in this application is related to U.S. patent application Ser. No. 08/772,731, "Low False Alarm Rate Detection for Video Image Processing Based Security Systems," filed Dec. 23, 1996; U.S. patent application Ser. No. 08/757,838, "Authentication Algorithms for Video Images," filed Nov. 27, 1996; U.S. patent application Ser. No. 08/771,991 "Reduction in False Alarms of Image Processing Based Security Systems by Performing Classification of Objects Detected," filed Dec. 23, 1996; and U.S. patent application Ser. No. 08/772,595, "Rejection of Light Intrusion False Alarms in Video Security Systems," filed Dec. 23, 1996.

STATEMENT REGARDING FEDERALLY SPONSORED RESEARCH OR DEVELOPMENT

Not applicable.

BACKGROUND OF THE INVENTION

This invention relates to a video security system having components physically located at a premise being protected and components located at a central station from which a number of premises can be simultaneously monitored; and, more particularly, to video security system which perform a continuous surveillance of each of the premises being monitored, which reliably detects and reports intrusions of any premises to the central station for a system operator to take appropriate action including reporting the intrusions to local authorities at the site where the premises is located, and which eliminates reporting of false and unwanted alarms whereby the operator is assured that any reported alarm is an actual intrusion. Further, the video security system has the unique capability of utilizing its video camera and associated capabilities as a new type of motion sensor in conjunction with conventional alarm system functions.

Conventional security systems typically protect a building using make/break contacts strategically placed at doors, windows, and other potential entry points. When a contact is broken and an alarm is sounded or relayed to a central control station located within the building, nearby to the building, or remotely to a central control station of the security company. Besides make/break sensors, security companies also use P.I.R. (passive infra red) sensors which sense heat differences caused by animate objects such as humans or animals. Also used are vibration sensors which, when placed upon a window for example, detect when the window is broken, and radio frequency (rf), radar, and microwave sensors, as well as laser sensing. As with the make/break sensors, when any one of the sensors indicates a detection, a system alarm is indicated. A trouble indication is also given if an alarm unit for the building to which the sensors are connected senses that a path to a sensor is interrupted or broken.

With current alarm systems, all that the receiver of an alarm, whether at a local or remote central station, knows is that an alarm has occurred. The mere fact of an alarm provides no indication as to its cause. The system operator has no other knowledge by which he can determine if an alarm signals the presence of a real intruder, or if it is a false alarm. Sensors are notorious for going off during inclement weather (they are sensitive to large electromagnetic fields such as occur during lightning conditions, etc.). Such an erroneous condition is properly referred to as a false alarm. When certain sensors are triggered as by the presence of animals within their precincts, an unwanted alarm is generated. Regardless of why they occur, all false and unwanted alarms detrimentally effect the efficiency and operation of a security system. For convenience, all false and unwanted alarms will be generally referred to as false alarms.

Many criteria determine whether or not an alarm condition exists. For example, when a person opens a door monitored by a sensor, a potential alarm condition is created. However, an alarm system typically has a keypad or other coded system control by which, if an appropriate entry is made within a prescribed period of time, signifies that the alarm condition is not to be acted upon. Rather, the entrant is someone authorized to enter the premises. Further, the class of intruder (human, animal, etc.) may be perfectly acceptable in one set of circumstances, but not so in another. The common situation is one where an intruder is a human, and his presence results in an alarm being given. However, if the intruder is a cat or a dog, for example, giving an alarm is inappropriate and would be considered a false alarm. In an aviary, on the other hand, the presence of a human might be perfectly acceptable, but the presence of a cat or dog should result in an alarm being given. Or, in an area where food is stored, the presence of a human may again be perfectly acceptable, but the appearance of mice or rats should trigger an alarm. There is currently no alarm system capable of classifying intruders, discriminating between acceptable and non-acceptable classes of intruders, and providing an appropriate alarm when the presence of an intruder from a non-acceptable class is detected.

False alarms plague the security system industry. While the situation is annoying when a false alarm is relayed to a local monitoring station, it is exacerbated when the alarm is relayed 2,000 miles or more to a security company's central station or monitoring facility which monitors a large number of widely separated facilities. Here, operators must use their experience of the particular circumstances surrounding the alarm (i.e., local weather conditions, past occurrences at that particular site, etc.), to determine whether or not the alarm is real. If their knowledge and experience tells them the alarm signifies an actual intrusion, they then relay the alarm to the local police for that site so the police can conduct a further investigation.

There are numerous examples of an alarm system being rendered ineffective simply because an operator at a control station had no insight into the facility where the alarm system was installed and from which an alarm emanated. As one example, an alarm was triggered by a cat left in a residence. The police were called but discovered nothing, not even the cat, because the cat hid from strangers. After repeated visits over a period of several hours, the police finally refused to investigate further. From that point on, the residence was essentially not protected. Over time, situations resulting from false alarms have continued to worsen. Now, police often require confirmation or evidence of an intrusion before investigating, or else they give priority to those situations where they have greater certainty an intrusion has occurred. Furthermore, in many locales, if the authorities investigate the report of an alarm and discover nothing, they will send the security company requesting the investigation a bill for their services. Security system companies have addressed this issue by providing an audio (or "listening-in") capability to the system. This enables the monitor to hear actual movement on the premises (the sound of voices, glass breaking, cabinets or drawers being opened, etc.,) with this information also being relayed to the authorities.

In response to this situation, the security industry has begun using video cameras to monitor premises. Use of cameras solves the problem of not just reacting to a make/break contact. The shortcomings with camera surveillance are that one needs a constant communications channel between the sensor (camera) and the operator at the monitoring site. Some alarm systems have combined video with another sensing mechanism, I.R., for example, so actuation of the video is controlled by the other sensor first sensing the presence of an intruder.

If video is continuously required for a properly functioning system, a communications channel having sufficient bandwidth to transmit video must be constantly connected between the site and the monitoring station, from the time the alarm system is energized until it is turned-off. Since monitoring periods often exceed 12 hours, communication costs are high. To help control communication costs, the cameras used are often slow scan cameras whose output is compressed onto POTS (plain old telephone system) lines (typically using 28.8 k modems) with transmission rates of 1 frame of video over a 1–5 second interval.

Importantly, when monitoring continuous video, most of the time, the operator will see nothing out of the ordinary. Yet, the operator must maintain a constant vigilance. This is a serious problem because it has been estimated that after watching a security system camera observing an unchanging scene for as little as 5 minutes, an operator's performance diminishes rapidly to the point where the operator is essentially ineffective after 30 minutes. As a consequence, the only real advantage of video monitoring is that should an intrusion occur, and should the operator notice it, then the relayed information sent to the local police gets high priority because of the certainty of the situation. Apart from this advantage, the deficiencies of such a system are that it is very labor intensive, operator efficiency is usually very low, and communications costs are very high.

As an adjunct to video surveillance, security companies also employ guards who are either stationed on the premise, or tour a number of premises using a patrol car to move from one site to another. Guards are expensive. Sophisticated criminals know they can determine the guards' routine and can plan break-ins at those times when a guard is somewhere else on the premise, or at a another site altogether.

The video security system of the present invention overcomes these problems by, inter alia, providing an alarm system operator indications of an intrusion (whether by humans or an unknown source) together with visual images of the intrusion. This keeps the operator from "crying wolf" because of false alarms, and provides a level of surveillance not obtainable even using guards. It is now possible, as described hereinafter, to relay definitive information to the local police of an intrusion, as well as capture, maintain, and transmit images of the intrusion to the police or other authorities. It is also possible to minimize, if not eliminate false alarms. Finally, it is possible to remotely perform a video guard tour of a premises, at any time, during unusual or extreme weather conditions, and without disturbing the normal routine of a premises.

In co-pending U.S. patent application Ser. Nos. 08/772,731; 08/757,838; 08/771,991; and 08/772,595; the teachings of which are incorporated herein by reference, there is described a system and method to i) continuously viewing a scene to detect motion, ii) to identify and classify the cause of the motion, iii) to selectively report the presence of an intruder with a very low probability of false alarms and a high probability of detection; and iv) to provide a method for viewing a scene, producing an image of the scene, authenticating that image, and relaying the authenticated image from the protected site to a remote, viewing site. As described in these applications a reference scene (reference image) is established and an image from the present scene (current image) is compared to that reference. It is then determined whether any differences exist between the present and reference images. If the contents of the two images markedly differ, the result is interpreted as an intrusion of some kind having occurred. The detection process includes comparing, on a pixel by pixel basis, the current image with the reference image to obtain a difference image. In accordance with the process, any non-zero pixel in the difference image indicates the possible presence of an intrusion (after image artifacts such as noise, aliasing of the video, and movement within the scene not attributable to a life form (animal or human) such as the hands of a clock, screen savers on computers, oscillating fans, etc., have been accounted for). Because the system and method use an absolute difference technique with pixel by pixel subtraction, the process, as described in co-pending application Ser. No. 08/772,595, is sensitive to surface differences between the images, is insensitive to light-on-dark or dark-on-light changes, and thus is very sensitive to any intrusion within the scene. Furthermore, each pixel represents a gray level measure of the scene intensity that is reflected from that part of the scene. Gray level intensity can change for a variety of reasons. The most important of these is a new physical presence at that particular part of the scene. The ability to make this determination, in accordance with the teachings set forth in these co-pending applications, removes from the human operator of the alarm system the initial responsibility of determining whether an intrusion results from a new human presence or an unknown source. This eliminates the need for the human operator to continuously monitor images from the sites being protected; and, in turn, helps the operator maintain a high level of vigilance. The detection and recognition for each premises is conducted on-site at that premise and the system is always vigilant. There is also now no need for a continuous, high level communication path between the premises and a central station of the system. When an intrusion is detected and a path is established, high frame rate and high quality video is transferred from the site to the operator so the operator can evaluate the video and concur with the evaluation an intrusion has occurred. Further, once an intrusion is detected, high resolution samples ("snapshots") of the video are taken and supplied to the security system operator at the central station. These samples are transferred using lossless compression techniques and are authenticated for later admittance into court for prosecution purposes.

Efforts have previously been made to incorporate object recognition, including recognition of humans, whose presence is detected or sensed in an image, into some type of control unit. U.S. Pat. No. 5,305,390 to Frey et al., teaches automatic recognition and classification of persons or objects as they pass through a doorway or entrance. The intrinsic sensor is an active laser beam, and the system of Frey et al. operates by measuring the height of an object passing through an aperture (doorway) to classify the object as a person or not. Therefore, the system is a height discriminator rather than an object recognition or classification system. Thus, for example, if a person crawls through the aperture, they will probably be designated as a non-human. Also, the intruder must be at a known location (door, window, etc.), or otherwise the detection scheme does not work.

U.S. Pat. No. 5,289,275 to Ishii et al., is directed to a surveillance monitoring system using image processing for monitoring fires and thefts. The patent teaches use of a color camera for monitoring fires and a method of comparing the color ratio at each pixel in an image to estimate the radiant energy represented by that pixel. A resulting ratio is compared to a threshold with the presence of a fire being indicated if the threshold is surpassed. A similar technique for detecting the presence of humans is also described. The patent teaches the use of image processing together with a camera to detect the presence of fires and abnormal objects.

U.S. Pat. No. 4,697,077 to Yausa et al. also teaches use of a camera to detect the presence of an object. Once an anomaly is detected because of differences in the comparison of an original and a later image, the system automatically dials and sends a difference image, provided the differences are large enough, to a remote site over a telephone line. At the remote site, the image is viewed by a human. While teaching some aspects of detection, Yausa et al. does not go beyond the detection process to attempt and use image processing to recognize that the anomaly is caused by a human presence.

U.S. Pat. No. 4,257,063 which is directed to a video monitoring system and method, teaches that a video line from a camera can be compared to the same video line viewed at an earlier time to detect the presence of a human. However, here, the detection device is not a whole image device, nor does it make any compensation for light changes, nor does it teach attempting to automatically recognize the contents of an image as being derived from a human. Similarly, U.S. Pat. No. 4,161,750 teaches that changes in the average value of a video line can be used to detect the presence of an anomalous object. Whereas the implementation is different from the '063 patent, the teaching is basically the same.

All of these previous attempts at recognition have certain drawbacks, whether the type of imaging, method of processing, etc., which would result in either an alarm not being provided when one should, or in false alarms being given. The video security system of the present invention overcomes these problems or shortcomings to reliably provide accurate indications of an intrusion, by one of an appropriately designated class, in an area being monitored by the system.

BRIEF SUMMARY OF THE INVENTION

Among the several objects of the present invention may be noted the provision of a video alarm system for continuously and reliably monitoring one or a number of premises. If more than one premise is being monitored, the video alarm systems enables all of the premises to be simultaneously monitored from a central station, even though the premises are remote from each other and the central station. For this purpose, the system incorporates automated video surveillance of a premise and intelligent image processing to filter out false alarms while reliably detecting any intrusions. The system operates on the premise that only the presence of an intruder of a designated class, or an unknown, is of consequence, that everything else which is detected may be ignored, and that other alarm conditions are met. A recognition process is used to differentiate between those objects falling within and without a designated class of objects, so to reduce or substantially eliminate false and unwanted alarms. In most circumstances, the designated class is human, but the differentiation process is to identify a class into which an intruder fits; e.g., human, non-human, and unknown. However, regardless of the class of interest, for objects falling within a selected class, an indication is given.

Another object of the invention is a video security system having a site control unit (SCU) on each premise being monitored. Each SCU controls the operation of a plurality of cameras strategically located about a facility, both inside and out. The SCU acquires, processes, compresses, and stores video images from a camera whenever an intrusion is detected by that camera. The SCU also stores full resolution snapshots of the scene monitored by that camera, at predetermined intervals after the intrusion is detected. The snapshots are authenticated to identify tampering with their contents should the snapshots be subsequently used in judicial proceedings. If commanded by the operator, the SCU can also provide live video to the operator. The SCU further can process and store audio linked with the video.

Another object of the invention is an alarm unit (AU) which connects with conventional sensors used at the premises, and a terminal adapter (TA) through which the AU can establish a full bandwidth ISDN communications channel between the SCU and a central station in the event of an intrusion. The system employs a local ethernet at each premises and the AU and TA can fully acquire and utilize an ISDN line whenever an intrusion necessitates. The AU arms/disarms a camera to allow/disallow recognition and to utilize cameras as motion sensors.

A further object of the invention is the use a video server (VS) at a central monitoring facility to and through which video signals from all the monitored premises are routed to a workstation. The VS operates in conjunction with a central alarm computer (CAC) to which an alarm from an AU is reported and at which the intrusion site is identified. The VS receives, logs, and stores all of the video transmitted to the central station (including live video), and provides the video to a workstation (WS) at the central station which is selected by the CAC as being available for use by an operator to view video as well as any associated data relating to the site at which a reported intrusion has occurred. The VS also stores and facilitates retrieval of historical video data for the premise being monitored and for the workstation activities at the time of an intrusion.

Another object of the invention is the efficient use of personnel and facilities. At the central station, operator time is economically used because only actual intrusions and unknown conditions are reported together with accompanying video data. Operators time (and their efficiency) is not wasted on viewing a video monitor on which the image will be generally unwavering the great majority of the time. Fewer operators can also monitor more sites than heretofore has been possible.

At a site, guards are more efficiently used because the system identifies intrusion situations, indicates monitors to be viewed, and areas for them to investigate. If guards are not on duty, intrusion data is quickly and reliably sent to a central monitoring station for investigative purposes. Facilities such as communication channels can be economically used because telephone lines and the like are only employed in the event of a detected intrusion, and then only for so long as is required to send and receive appropriate data and instructions.

Finally, remotely initiated and controlled guard tours of a premise can be made at any time, under all weather conditions, and without intruding into, or effecting, other operations on the premise. In addition to guard tours, the system is capable of being walk tested, and the system employs a "hand-off" protocol when guards on duty at a premise are preparing to go off duty.

In accordance with the invention, generally stated, a video security system monitors a plurality of separate premises from a central station. Each site has a site control unit for acquiring and processing visual images of locations about the premises. Motion by an intruder, detected by the site control unit, produces an alarm input to an alarm unit also located at the site which then determines if data should be transmitted from the premise to the central station. A terminal adapter responsive to the alarm unit establishes a communication channel between the premise and the central station for transmission of live video, stored video, authenticated snapshots of the scene, compressed video, and audio to the central station. A video processor at the central station receives and stores these inputs and in conjunction with a central alarm computer makes the transmitted signals available to a system operator at one of a plurality of workstations located at the central station. The operator, after viewing the transmissions, can, if the intrusion is verified, alert appropriate authorities to further investigate the premise. Other objects and features will be in part apparent and in part pointed out hereinafter.

BRIEF DESCRIPTION OF THE SEVERAL VIEWS OF THE DRAWINGS

In the drawings.

FIG. 2 is a representation of a facility in which a site control unit, alarm unit, and terminal adapter of the security system are installed;

FIG. 8A represents a frame of video (snapshot) obtained from a camera, and FIG. 8B a compressed frame (thumbnail) of video;

FIG. 9 is a representation of a time line to illustrate the frame rate at which images are acquired by the imaging system of the site control unit, and at which snapshots can be provided by the site control unit to an alarm system operator;

FIG. 10 is a representation of the image storage capability of the site control unit;

Corresponding reference characters indicate corresponding parts throughout the drawings.

DESCRIPTION OF A PREFERRED EMBODIMENT

Figure 1:
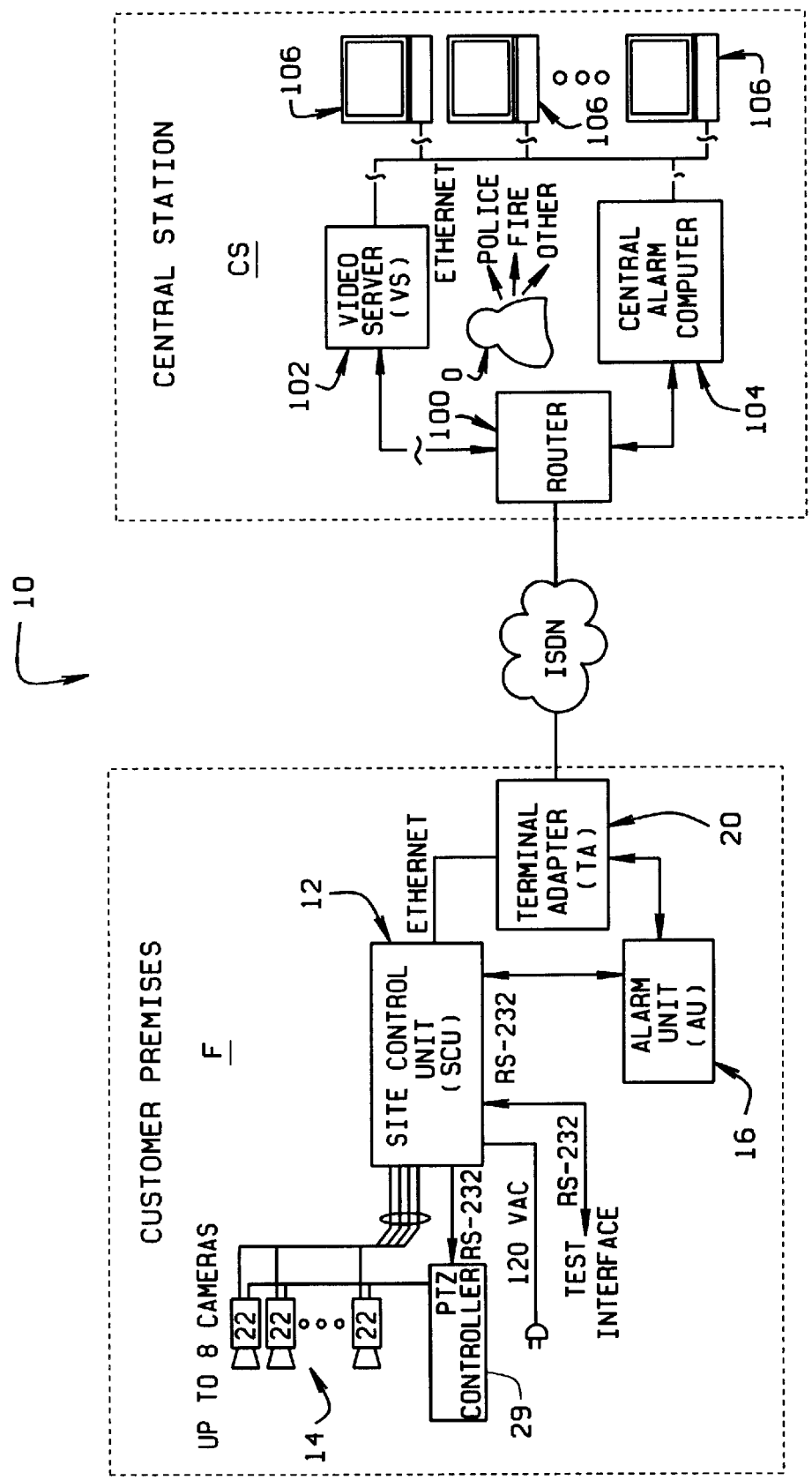
FIG. 1 is a block diagram of a video security system.
Figure 3:
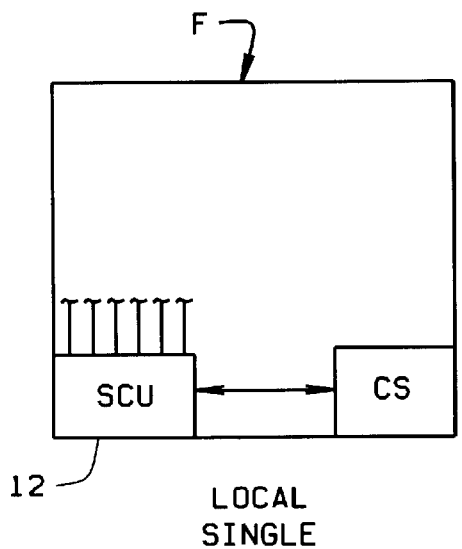
FIG. 3 is a simplified representation of a single site control unit used in conjunction with a local system controller.

Referring to the drawings, an alarm or video security system 10 shown in FIG. 1 includes a site control unit (SCU) 12 preferably physically located at an installation or facility F being monitored by the system. The SCU has an associated imaging means 14 and operation of the SCU and the imaging means is more fully described in copending application Ser. No. 08/904,510. An output from the SCU is directed to an alarm unit (AU) 16 whose operation is more fully described in co-pending application Ser. No. 08/904,949. The SCU provides an output to a system control 18 via a terminal adapter (TA) 20. Operation of the terminal adapter is more fully described in co-pending application Ser. No. 08/904, 313. An operator O monitors the facility from a central station CS and the information (images, audio, data) provided him or her by the SCU. The operator evaluates this information and, when necessary, informs police, fire, medical, or other authorities of a condition detected at the facility where SCU 12 is located. At the central station, a signal router 100, video server (VS) 102, and a central alarm computer (CAC) 104, are interconnected with a plurality of workstations (WS) 106 to display video images and other information to the operator to assist the operator in determining whether the intrusion requires alerting the authorities. Operation of the video server is more fully described in co-pending application Ser. No. 08/904,510, that of the central alarm computer in co-pending application Ser. No. 08/904,948, and that of the workstation in co-pending application Ser. No. 08/904,947. Although operation of various of the alarm system components are described in the referenced co-pending applications, whose teachings are incorporated herein by reference, a general description of these components in included herein to assist the reader in understanding the operation of the security system 10.

Two important features of the invention are first, that it informs operator O of the presence of an intruder at the facility, after having not only detected the intruder's presence, but also having confirmed that the intruder is one of a designated class(es) of intruders (usually a human intruder) for which some action is to be taken. The designated class can include unknown. For purposes of the following description, unwanted intruders whose presence are to be detected are human intruders. Second, it is important that false or unwanted alarms not be generated. To not place unduly high demands on operator O, and efficiently use his or her time, the invention operates to eliminate all false and unwanted alarms which might otherwise be given to the operator. This is done without impacting the overall probability of detecting and confirming the presence of an intruder, and providing this information to the operator. With other security systems, a fundamental cause of false alarms has been the sensors and methodology used to ascertain if an intrusion has occurred. In these systems, both an alarm and video are sent to an operator with the operator having the sole responsibility of examining the video and determining if there is an actual intrusion or not. As described in the above referenced co-pending application Ser. Nos. 08/772, 731, 08/757,838, 08/771,991, and 08/772,595, use of appropriate processing methodology accounts for various effects which could otherwise trigger false alarms, so only a life form intruding into a scene produces an alarm. By quickly and efficiently differentiating between motion caused by humans and non-humans (animal) and other lighting effects, the monitoring task of the operator is simplified with actual intrusions resulting from detected human motion causing an alarm, but with unwanted alarms resulting from the motion of animals and lighting effects not being given.

Referring to FIG. 2, facility F is representative of the type of location with which security system 10 is used. That is, the facility has windows W and doors D. The windows may, for example, be provided with sensors S1 and each of the doors with a sensor S2. Both sensors S1 and S2 may be conventional make/break sensors, although sensor S1 may be a vibration or glass break sensor. An infrared or microwave motion sensor S3 is installed in a passage through the facility to detect someone moving through the passage. Sensors S1–S3 are all well-known in the art. Security system 10 includes a SCU 12, AU 16, and TA 20 all of which are shown in FIG. 2 as being located on the premises, although none of them have to be. It will be understood that the SCU, AU and TA, although separately shown in the drawings and described herein, may be combined into a single component. Imaging means 14 (see FIG. 1) includes a plurality of video cameras 22 strategically located both inside and outside the facility. Outputs from the cameras 22 are routed to an image acquisition means 24 (see FIG. 7) of the SCU which, in turn, is connected to AU 16, and to TA 20. The window and door sensors S1, S2, and motion sensor S3 are connected to the alarm unit. Although shown located side by side in FIG. 2, the SCU, AU, and TA do not have to be in close proximity The function of the SCU is to intelligently look at video acquired from each of the cameras to determine if an intruder is present within any of the scenes viewed by the cameras. If it is determined that this is so, the SCU sends an indication to AU 16. The function of the AV is to review the alarm indication and determine whether or not it should be reported to the central station. If the AU decides to do so, the AV senses an alarm through TA 20, to the central station. The AU further commands the SCU to transmit its video, also through TA 20, to the central station TA 20 using appropriate communication channels as described hereinafter, passes this information from the premise to the central station. Importantly, video is not ordinarily transmitted from the SCU to the central station unless the SCU and AU determine there is adequate reason for operator O to investigate. In that way, the operator does not have to continuously monitor unchanging video with which there is a low probability of an intruder presence. In fact, the reverse is true. That is, because the possibility of an intruder being present at a facility at any one time is remote, the operator can readily monitor many premises from the central station, even though these premises are widely separated from one another. When the SCU confirms the presence of an intruder at a facility, a video image obtained from a camera at that site is provided to the operator. If the operator then determines that the situation bears investigation, the operator relays this information to investigating authorities. Further, the operator can provide the authorities with an accurate assessment of the situation at the facility so they can take the necessary precautions based upon the number of intruders, their ages, whether or not they appear to be armed, etc.

As noted, sensors S1–S3 are connected to AU 16. With this configuration, when a sensor triggers an alarm, the system operator can request a visual verification of the alarm condition from the nearest camera controlled by the SCU. This allows the operator to visually verify or reject the alarm condition with the same results as if the indication had been triggered by the SCU. A control panel P, including a keypad K, may be conveniently located on the premise such that when the system is armed and someone enters the premises, the person can enter an appropriate code into the keypad at panel P to signify that the entry unauthorized or reportable, no intrusion has occurred, and hence no alarm condition is reported to the central station. An additional feature of system 10 is that the operator or CAC 104 can remotely command the SCU to cycle through the cameras 22 under their control and so execute a remote guard tour of the premise. This has substantially the same effect as a guard touring the premise; except that this tour is remotely controlled, can be done at any time, under any weather Conditions, and it can be done faster than a guard could do it. It is possible therefore, with system 10, to reduce or eliminate certain guard duties without detracting from the facility's overall security. When initiating a remote guard tour, the operator or CAC establishes and controls a communication path between the SCU and the central station. As a security check, the system, using a secure password mechanism, first establishes the communication link. Then, through the SCU, cameras 22 are selected to observe scenes of the premise. The SCU temporarily suspends detection on each particular camera when it is selected, but continues to check the scenes observed by the other cameras so to maintain system vigilance. When viewing of one scene is completed, another camera is selected by the operator or CAC. SCU 12 accordingly suspends detection from the newly selected camera, and places the previously selected camera back into its surveillance mode. For the selected camera the operator or CAC is free to pan, tilt or zoom the camera to obtain a better view of the scene, or a portion of a scene which is of interest. As part of the tour, selected cameras may be required (preprogrammed) to view particular areas of the premise which are of interest. The CAC generates and maintains a log for each tour containing information as to when performed, cameras used, operator notes, etc.

Figure 4:
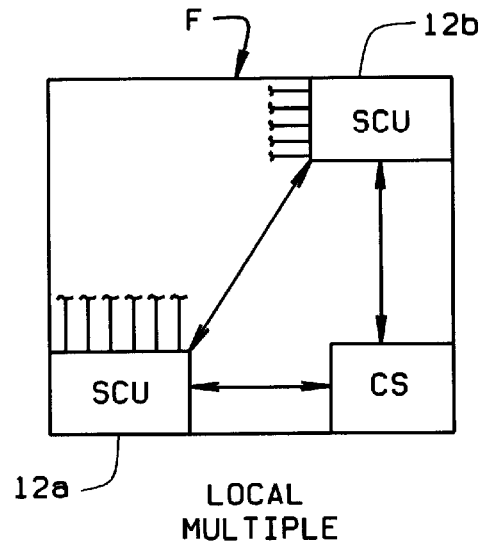
FIG. 4 is a simplified representation of multiple site control units used in conjunction with a local system controller.
Figure 5:
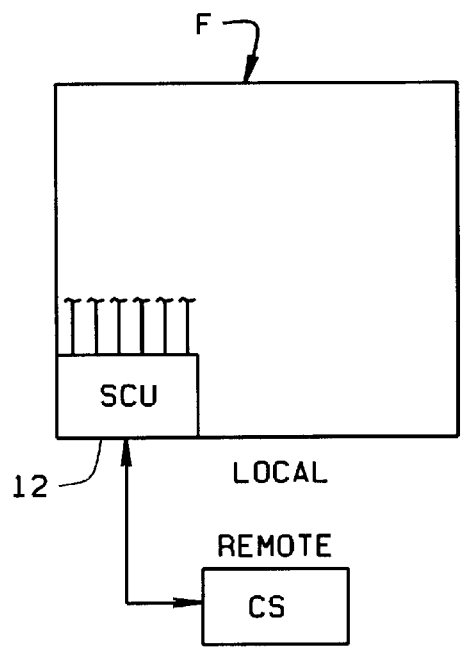
FIG. 5 is a simplified representation of a single site control used in conjunction with a remote system controller.
Figure 6:
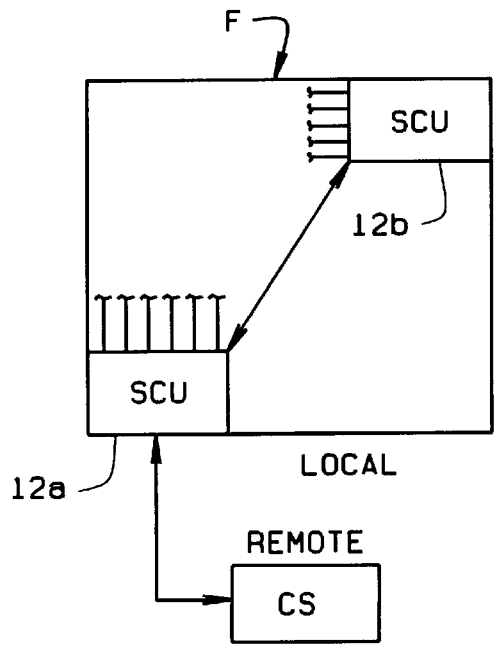
FIG. 6 is a simplified representation of multiple site control units used in conjunction with a remote system controller.

Referring to FIGS. 3–6, system 10 can be configured in a variety of ways using one or more SCUs. Thus, in FIG. 3, both SCU 12 and central station are located at the same site. Depending upon the amount of monitoring utilized at a site, two or more SCUs, 12a, 12b, for example, are located at the site and both SCUs are locally controlled from the same central station. This is as shown in FIG. 4. FIGS. 5 and 6 illustrate the situation where a single SCU 12 is located at the site and the central station is at a remote location. Or, even if two or more SCUs 12a, 12b are on site, both can be remotely operated from the central station.

SCU 12 includes an image acquisition section 24 which receives video signals from each of the cameras 22, these signals representing images of the scene observed by the respective camera. Module 24 includes one or more multiplexers (MUX) 26. The SCU can accommodate a number of cameras 22, eight such cameras being shown in FIG. 2. The limit on the number of cameras is determined by the capacity of the multiplexers, the maximum distance cameras can be located from the SCU, and the time required during an operating cycle of the system to access all of the cameras before repeating the cycle again. This, in turn, is a function of processing power and speed of the SCU. For the eight cameras 22 shown in FIG. 2, for example, the cycle time for the SCU is approximately 1 second.

The cameras 22 are television cameras. It will be understood by those skilled in the art that the cameras may be black and white cameras, color cameras, or a combination of both. The cameras may conform to an analog television format standard such as the RS170 or CCIR standards, or the camera input may be digital. Depending upon the area where they are located, some or all of the cameras may be low light cameras. Cameras 22 also do not need to operate in the visible portion of the light spectrum. Thus, the cameras may include IR (infra red) cameras or UV (ultra violet) cameras. In addition, for processing purposes, it is immaterial whether the image is even from the optical portion of the spectrum. The image may be created from the rf portion of the spectrum in which instance they may be high resolution SAR images, or an acoustic image can be produced from the acoustic portion of the spectrum. It will be understood that while an installation will typically employ only one type of camera (black and white, or color TV cameras, for example), the SCU can process images created from a combination of all of the cameras or image sensors discussed above and employed at the same time in a facility. As use of the facility changes, one type camera 22 can be replaced with another type camera without affecting overall performance of the system.

In operation, a controller section 28 of the SCU responds to commands from the central station and AU 16 to operate the cameras. The SCU also receives commands from the system operator to turn cameras "on" and "off". In addition, the SCU is programmable to automatically turn the cameras "on" and "off". Usually, the SCU is programmed to turn the cameras "off" during that portion of a day when the premises being monitored is normally occupied. The SCU then automatically turns the cameras "on" at a preset time at the end of this period, or the last person to leave the premises may instruct the SCU to do so by activating a security system switch located on panel P. The SCU then controls the monitoring function performed by the cameras until it automatically shuts "off" the cameras at a preset time, or someone shuts the system off using a coded input or the like. During the monitoring period, the SCU sequentially cycles through each of the cameras obtaining images from each. The cameras are connected to a pan, tilt, and zoom (PTZ) controller 29 and controller 28 utilizes the pan, tilt, and zoom capabilities of the cameras, as appropriate, to obtain the best possible images for processing. The cameras provide video signals at a controllable frame rate which can be a constant frame rate (15 Hz, for example). The frame rate for each camera is separately controllable.

Video signals from the cameras are provided as inputs into an image processor section 30 of the SCU. Processor 30 looks sequentially at an image from each camera 22, and compares that image to a prior stored image from the same camera. The stored image is continually updated. Processor 28 incorporates those algorithms and processing methodology described in co-pending application Ser. Nos. 08/772, 731, 08/771,991, and 08/772,595, to analyze the contents of the images represented by these signals to determine the presence of an intruder. For this purpose, processor 30 includes a video masking section 32, a detection section 34, and an object recognition and labeling (classification) section 36. It will understood that the functions performed by processor 30 may be incorporated in computer software programmed to execute the algorithms employed as part of the detection, analysis, and classification processes. In operation, video masking section 32 is used to filter known motion present within a scene. Detection section 34 operates to detect movement in unmasked portions of a scene. Recognition section 36 then operates to classify and label the cause of the movement. An indication is given only if recognition section 36 identifies the cause of the movement as one of a class of predetermined causes representing an intruder on the premises.

As described in these co-pending applications, processor 30 operates to discover if there is a change in any of the scenes being viewed by the respective cameras 22, and if any such change is caused by, i) noise, such as video aliasing, or ii) an inanimate object, such as lighting changes, lightning, flash lights, car headlamps, the moving hands of a clock, computer screen savers with moving objects, air conditioning or heating blown drapery, rotating machinery, etc.; or iii) an animate object, animal or human. As previously discussed, only the latter constitutes true detection of an intruder. The rest constitute a false or unwanted alarm were an alarm given to a system operator O. Those skilled in the art will understand that any of the other causes of a change in a scene could be discerned by an operator, provided an adequate quality of video were relayed to the operator. But, it is an important advantage of system 10 that the monitoring function, including classification, is performed on site, so the overall probability of a false alarm being given is negligible. And, the reliance of the system on the continuing vigilance of the operator to detect an intrusion has been eliminated, because system 10 is always vigilant. Were a human present, and if processor 30 failed to detect him or her and alert the operator, then the system detection fails not because of a failure of the operator, but because the operator is never made aware of the intrusion. However, the ability of the SCU to discriminate between a human presence and those conditions which would cause false alarms is a key advantage of alarm system 10. The fact the alarm system does not need an auxiliary sensor such as one of the sensors S1–S3 to trigger the SCU, and the fact that the processor portion of the SCU discriminates beyond just differencing two frames of video makes system 10 a more powerful monitoring and detection tool than existing alarm systems, none of which have the discrimination and classification capabilities of the alarm system. The classification made by recognition/classification section 36, in addition to human intruders, also includes unknowns. This latter is important, because while it is an advantage of the system not to send false or unwanted alarms, it is also important not to miss an intrusion. Thus, by classifying that which processor 30 cannot identify as a source for which an indication is given, the operator is provided the opportunity to view the video accompanying the indication, so the operator can bring his or her judgment to bear on the situation. It will be understood, that in effect the camera combined with the image acquisition, image processing, video processing, and controller portion of SCU 12 comprises a new, state-of-the-art, discriminating motion sensor which not only detects motion, but classifies the cause of the motion and selectively reports the incidence of motion only when the cause is of one of preselected classes, and to not otherwise report. It will be further understood that all detected incidents can be reported, by class of causation, if so desired.

The majority of the time SCU 12 will cycle from camera to camera, and because the scenes from these cameras will be unchanging, there will be nothing to investigate. This substantially reduces the work load of an operator O making it easier for operators to monitor more premises than has previously been possible. Additionally, the level of communications required between the monitored premise and the central station is usually minimal, since, most often, there is nothing to report. This results in substantial savings in the cost of communication channels, i.e. telephone bills.

When the processing performed by processor 30 indicates the presence of an intruder, SCU 12 performs a number of tasks. First, the SCU acquires and stores a full resolution "snapshot" X of the event. That is, the snapshot comprises a full frame of video taken from a camera observing the scene where the intrusion has occurred. Referring to FIG. 8A, this figure represents a full frame of video obtainable from a camera 22. The frame size is, for example, 512*480 pixels. In the processing operations performed by processor 30, the full frame image of a scene is processed. Snapshots of the scene are taken at predetermined intervals after motion is detected. Referring to FIG. 9, a time line is represented for the frame rate at which images are obtained by a camera 22. As previously noted, the frame rate is 15 Hz. At time To, a frame Fn is created. Thereafter, at intervals of one-quarter second, for example, the frame created at the time is used to produce a snapshot X1–Xn. Thus, from time $T_0$ to time $T_1$, snapshots are created for the respective frames $F_{n+1}$, $F_{n+2}$, $F_{n+3}$, and $F_{n+4}$. Snapshots are taken from the frames produced by whichever camera is selected at a particular time. All of these snapshots are stored in a snapshot buffer 40 of the video recorder, and the buffer has the capacity to store several snapshots. It will be understood that the number of snapshots which can be stored in buffer 40 is a function of the capacity of the memory and that, if desired, all of the snapshots could be retained were the memory large enough. Usually, unless an intrusion has been detected, there is normally no reason to retain snapshots. Thus, as shown in FIG. 10, the respective snapshots are discarded on a first in-first out basis by buffer 40. That is, the oldest snapshot (the first one in) is discarded (first out) to make room in the buffer for the most recent snapshot. When an intrusion is detected, the snapshots for that event are first authenticated and then sent to the central station. Image authentication is performed at a section 42 of the video processor and is performed in accordance with the teachings of co-pending application Ser. No. 08/757,838. The authenticated snapshot is now data compressed, as indicated at 44, and supplied to the central station through a video output 46 of the SCU, and terminal adapter 20.

Figure 11:
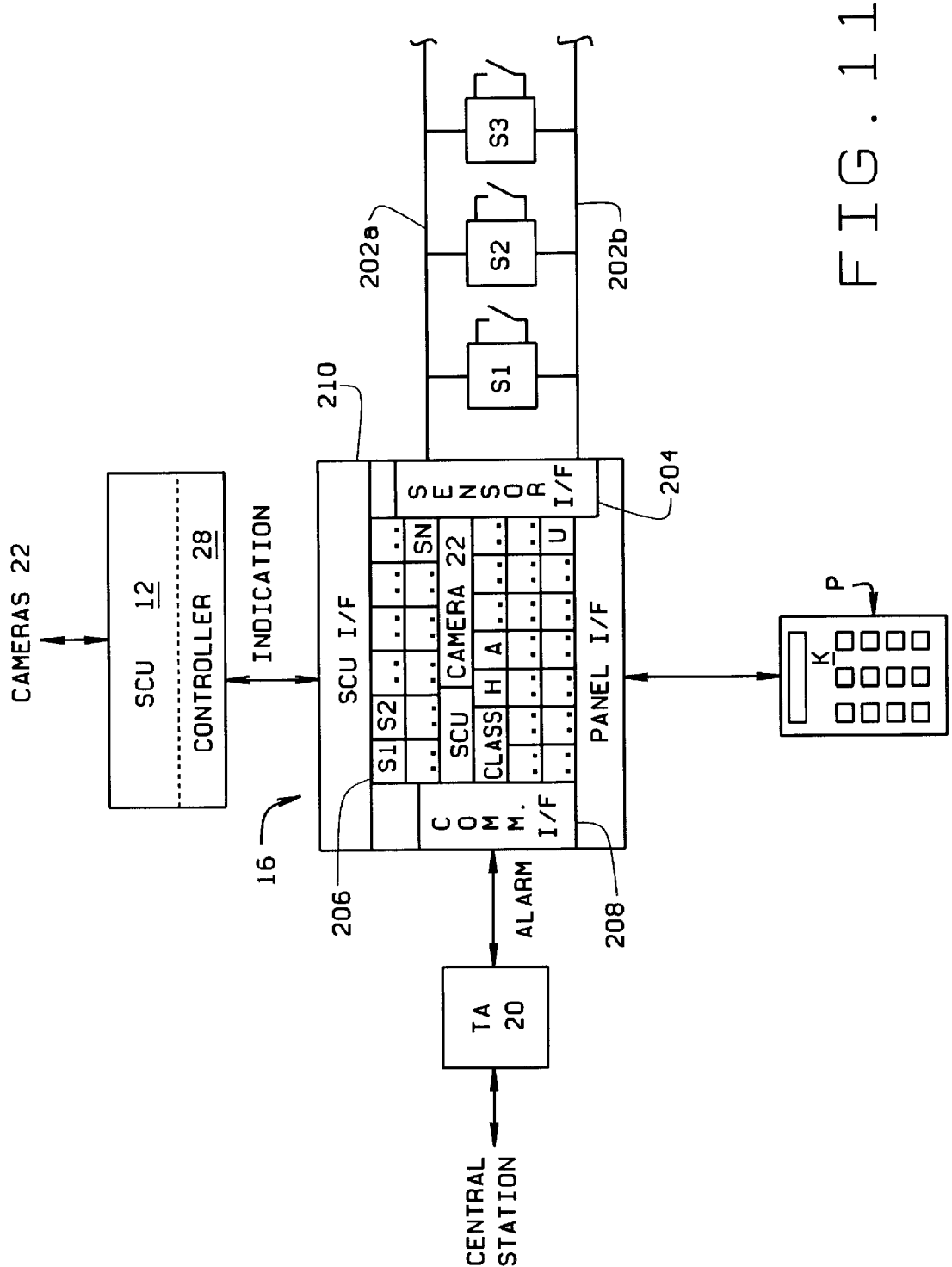
FIG. 11 is a block diagram of an alarm unit of the security system.

In addition to transmitting the snapshot, the SCU alerts AU 16 which, in turn, actually communicates the alarm to the central station. In addition, the AU, through TA 20 takes control of the entire available communication channels available at the site. As shown in FIG. 11, AU 16 includes a pair of power/sensing lines 202a, 202b across which the various sensors S1–S3 are connected in parallel. The sensing output of each sensor is supplied to an interface 204 of the AU. The AU further includes a processor/memory section 206 which has a plurality of memory segments, one for each sensor. Anytime one of the sensors is triggered, an appropriate portion of the memory is updated, and an alarm signal is provided through a communications interface 208 to TA 20.

AU 16 interfaces with controller 28 of the SCU through an interface 210. The indication of a confirmed intrusion is provided to the AU through this interface. The AU memory 206 includes a section for the SCU; and, in particular, the memory allows the various of classes of detected causes of motion to be registered. Thus, the memory can store each incidence of detection for all classes, including those such as human (H), animal (A), and unknown (U), which, for a specific monitoring situation will result in the AU generating an alarm.

Figure 12:
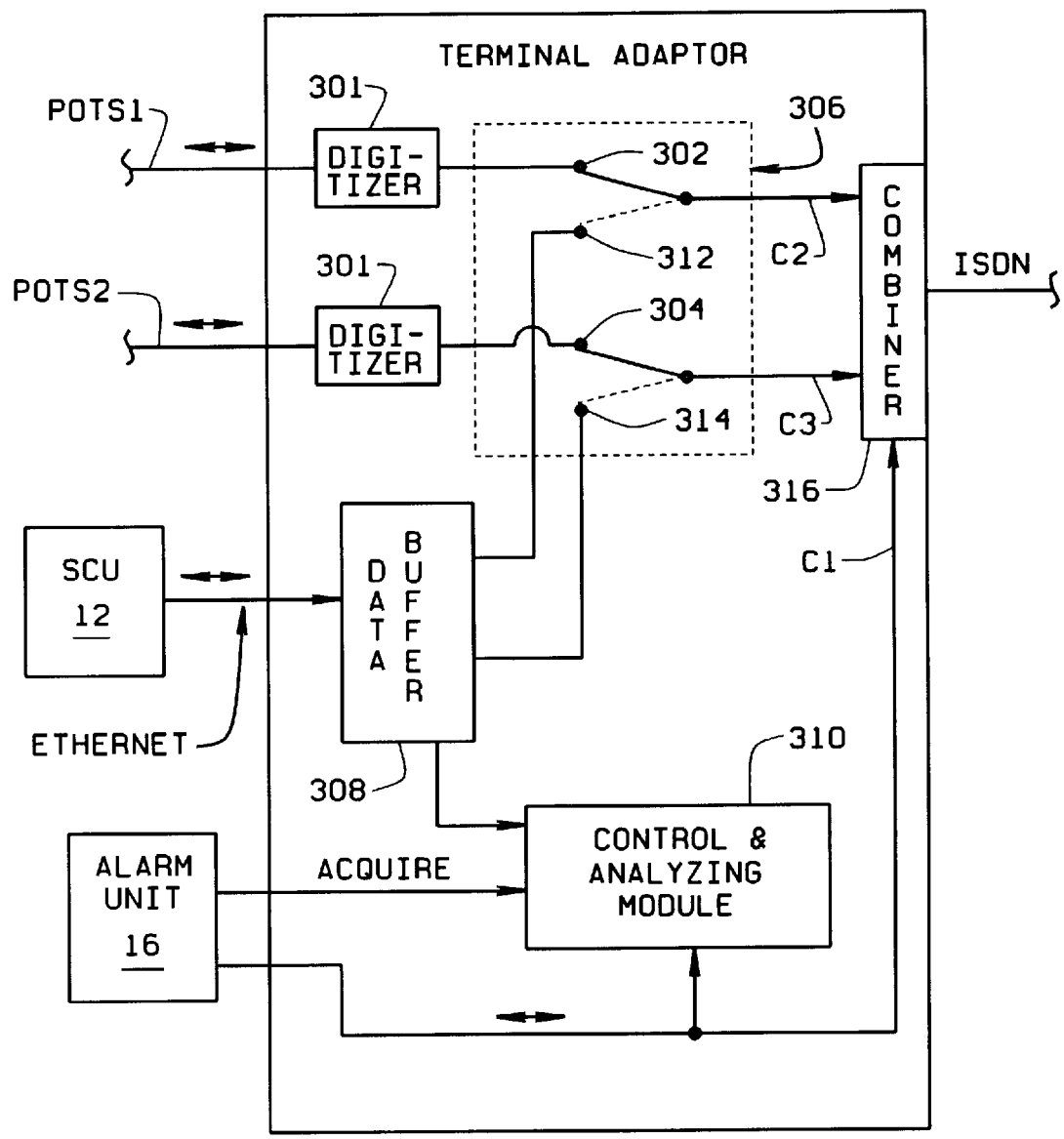
FIG. 12 is a block diagram of a terminal adapter of the security system.

As shown in FIG. 12, terminal adapter 20 connects to both SCU 12 and AU 16. The AU unit may have a constant or periodic ommunications path on the "D" channel of an ISDN line C1 which goes from the AU, through TA 20, to central station CS. In addition, two telephone lines POTS 1 and POTS 2 are routed through the terminal adapter. Both of these lines are connected through digitizing modules 301 to respective contacts 302, 304 of a two position switch 306 which, while an electronic switch, is shown in FIG. 12 as a ganged switch. On the other side of the switch, are two ISDN line "B" channels respectively designated C2 and C3. The video output of SCU 12 is routed over an ethernet line to a data buffer 308 of the TA. During normal operation, traffic flow between the premise and central station comprises two-way traffic over the ISDN. Contact arms of switch 306 are in their solid line position shown in FIG. 12, and both of the POTS line are available for whatever usage the operator of the premise wishes to put them.

When an alarm condition arises, TA 20 operates to seize control of the two "B" channels to provide a combined ISDN communications channel having sufficient bandwidth for video from the SCU to be transmitted to the central station. For this purpose, the TA includes a control module 310 whose function is to acquire and maintain control of the POTS lines. Module 310 initiates its acquisition function in one of three ways. First, AU 16 may provide an acquire input directly to the module. On receipt of the input, module 310 causes the ganged contact arms of switch 306 to move from the respective contacts 302, 304, to new contact positions 312, 314. These are the dashed line positions shown in FIG. 12. Now, the communication lines C2 and C3 are connected to data buffer 308. Video signals transmitted from the SCU now flow through the ethernet connection at the premise into data buffer 308, through the buffer and switch 306 to lines C2, C3. A second way module 310 knows to seize control of the channels is by monitoring the data on line C1. When the module recognizes predetermined data (such as a telephone number or embedded command) from its analysis on line C1, it will seize control of the POTS lines. The third of way module 310 knows to seize control is to monitor data being inputted into buffer 308 from the SCU. When the module recognizes predetermined data from its analysis of the buffered information; it, again, seizes control.

Communications lines C2 and C3 and combined with line C1 at a combiner module 316 of TA 20. The lines are combined to form an ISDN communication path the usage of which is controlled by the TA for so long as the alarm condition is being investigated. During this period, snapshots, compressed video, live video, and audio is sent back and forth over this path. When the alarm condition ends, module 310 operates to release lines C2 and C3 back to the respective POTS lines.

When an intrusion is detected, SCU 12 attributes more time to the camera that first detected the event. Processor 30 continues image processing in order to confirm or cancel the alarm according to whether or not the discrimination on that camera is consistent. Simultaneously, the SCU also continues to check all of the other cameras, albeit at a reduced service rate, to check for any intruders in their observed scenes. If an intrusion is confirmed by the continued processing performed by image processor 30, SCU 12 compresses subsequent frames of video and stores them as described hereinafter. This is in addition to the SCU continuing to periodically take and store full resolution snapshots for transmission to the central station once the communication path to the central station is established.

Once established, video images are continuously compressed and relayed to the system control. This done with minimum latency, at a fast frame rate, and with as good a quality as is permissible by the communication channel band width and the requisite compression required. Preferably, communications is through an ISDN line which offers, by banding two "B" channels, 128 Kbps for video transmission. Using an H.261 video compression system, an uprate of 15 frames/sec using a CIF formatted (352×288) video can be achieved. The task of a system operator O at the central station is readily achieved if SCU 12 provides a fast update rate with good quality video, within the channel bandwidth allocated, and with little to no latency. H.261 is a compression standard that enables the desired level of performance to be achieved over an ISDN line. With the use of more sophisticated compression schemes, around the H363 ITU standard, for example, SCU 12 will provide comparable performance over a POTS line. Minimizing latency is important because apart from SCU 12 periodically storing full resolution snapshots of the frame size shown in FIG. 8A, operator O can instruct the SCU to take snapshots. Upon receipt of snapshots from the SCU, the operator's task is to confirm the presence of an intruder and relay the information to the necessary authorities for them to investigate.

While operator O is viewing the scene from the camera 22 from which the first event occurred, SCU 12 continues to monitor the rest of the facility with the other cameras being used. Should one or more of these cameras also detect the presence of an intruder, then operator O will be alerted to these occurrences as well with the SCU now providing snapshots from these other cameras as well as those from the first camera. Once the authorities have been alerted, operator O can turn his attention to viewing snapshots from other cameras. It will be understood, and as described in co-pending application Ser. No. 08/905,510, all video communications between SCU 12 and the central station are stored for later analysis at video server 102. As noted, by the time a communications path is established between the SCU and the central station, the SCU will have stored a number of snapshots. Upon request by the operator, "thumbnails," or abbreviated snapshots are transmitted to a workstation 106 at the central station where they can be arranged in a mosaic pattern by the operator for his or her viewing. After viewing the thumbnails, the operator can select one or more of the images for transmission from SCU 12 to the system control. Reviewing thumbnails is comparable to reviewing multiple photographic slides at once, with the intent to select one or more for "blowing up" to full size prints. In the preferred embodiment, a thumbnail is 1/16 the size of a snapshot (i.e. every fourth pixel and every fourth row of a frame as depicted in FIG. 8A and shown as in FIG. 8B) and can therefore be transmitted in 1/16 the time of a snapshot. After viewing the snapshots, the operator can select one or more full size images (snapshots) for transmission. This new transmission of snapshots is at a slower rate using lossless compression techniques and full RS170 resolution. This is useful for identification purposes, and for confirmation of details to the police. Eventually all snapshots may be transferred from the SCU using lossless compression. Each snapshot is authenticated again using the process described in co-pending application Ser. No. 08/757,838. In addition to being authenticated at the source (i.e., SCU 12), each snapshot is verified upon reception at the central station so verified, authenticated images can be later used for prosecution purposes.

Figure 13:
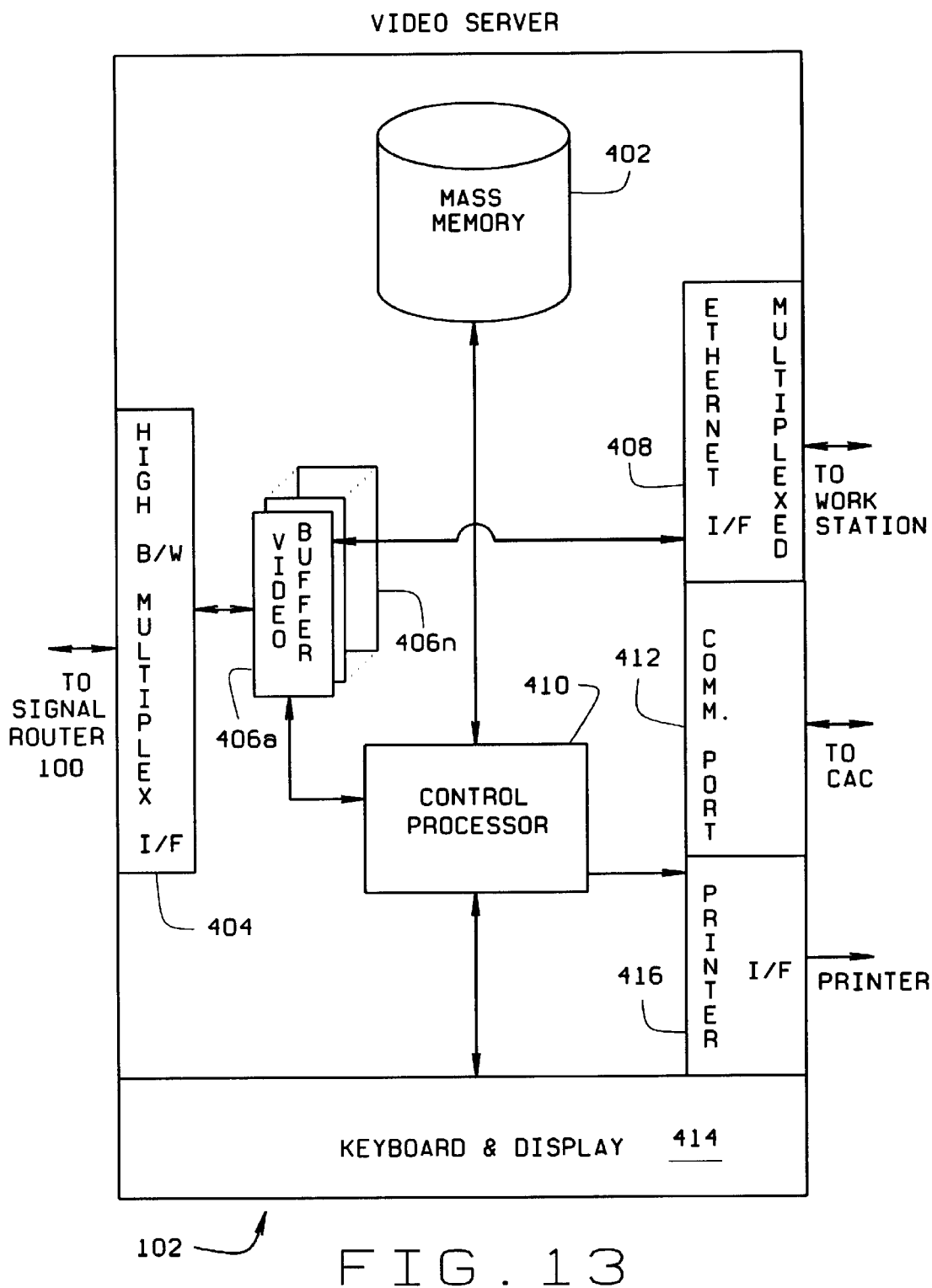
FIG. 13 is a block diagram of a video server of the security system.

Referring to FIG. 13, video server 102 includes a mass memory 402 in which is stored video and interleaved audio signals supplied by the SCU through the AU and TA. The video server is connected to signal router 100 through a high bandwidth, multiplexed interface connection 404. Video and audio signals transmitted from the various monitored premises are first buffered in a buffer 406a–406n. The signals are then routed through the video server to one of the workstations 106 through a multiplexed ethernet interface 408. Or, if so commanded by a control processor 410, the signals are routed to memory 402 for storage. In addition to storing video and audio signals from a current intrusion, memory 402 further provides a storage medium for archival video and audio signals relating to previous intrusions which occurred at the various premises.

Control processor 410 is connected to central alarm computer 104 through a communications port 412 for routing commands from the CAC to the video server to be used to control routing of video and audio signals to a workstation selected by the CAC. The video, whether buffered or live, snapshots, thumbnails, or archival, is routed to the selected workstation over an ethernet. In addition, audio from the workstation being sent back to the monitored site is routed through the video server to signal router 100 for transmission back to a SCU 12 at the site. A keyboard and associated display 414 enables an operator to also control operation of the video server; for example, to purge memory 402. Finally, the central processor can route video and audio information to a printer interface 416 for recordation of the video and audio on appropriate media.

Figure 14:
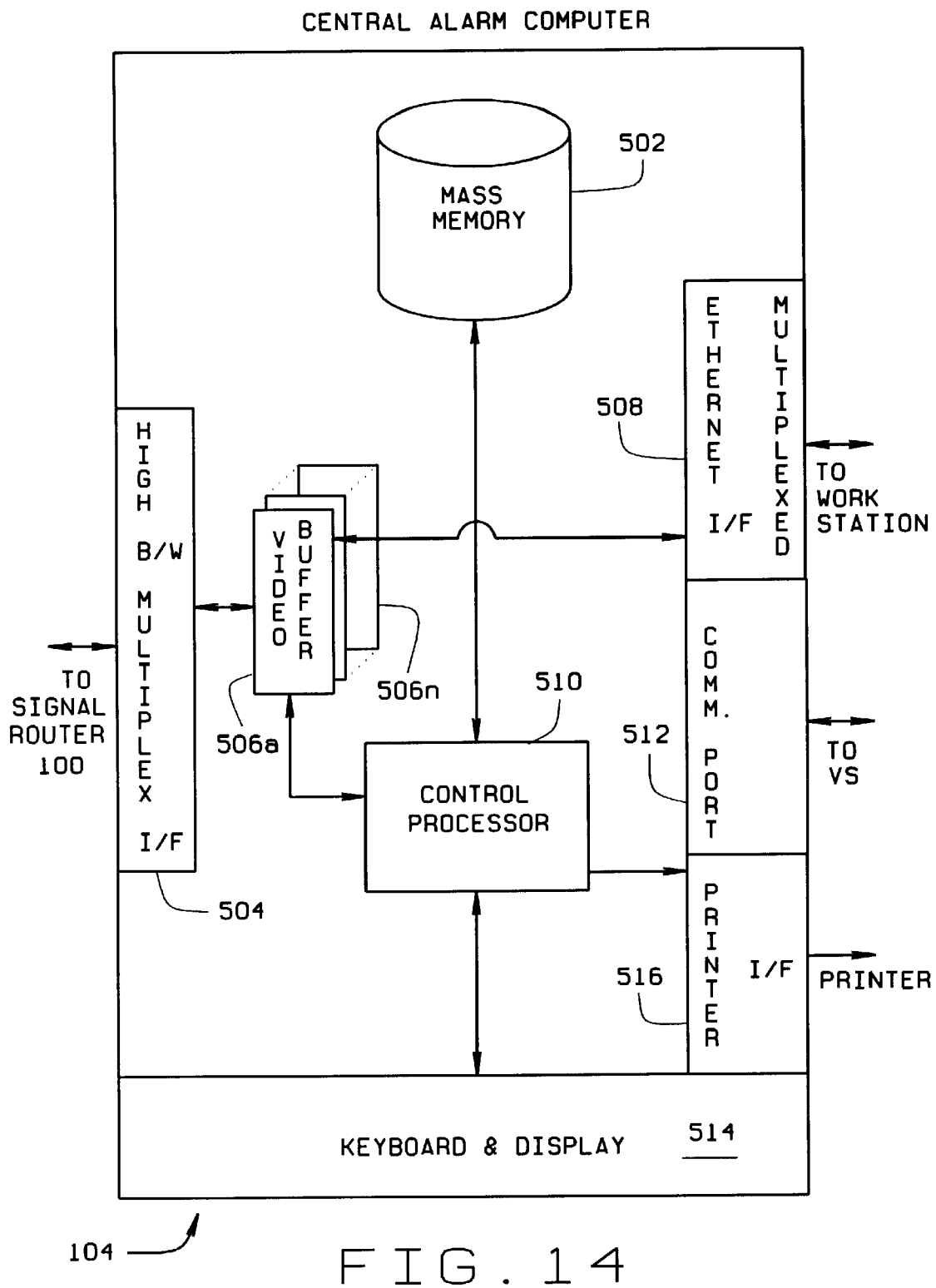
FIG. 14 is a block diagram of a central alarm computer of the security system; and, FIG. 15 is a representation of a workstation monitor on which snapshots produced by a site control unit are displayed.

Referring to FIG. 14, central alarm computer 104 has a mass memory 502 in which is stored data relating to the various premises being monitored. The computer is connected to signal router 100 through a high bandwidth, multiplexed interface connection 504. An alarm signal from a monitored site is supplied to the computer through this interface, and command signals by which video and audio signals relating to the intrusion are transmitted to the central station emanate from the computer and are transmitted to the site from the computer. Intrusion site data (site address, which sensors have been triggered, etc.) received at the computer is first buffered in a buffer 506a–506n. The data is then routed through the computer server to one of the workstations 106 through a multiplexed ethernet interface 508. Or, if so commanded by a control processor 510, the data is sent to memory 502 for storage. In addition to storing data relating to a current intrusion, memory 502 also stores data relating to previous intrusions which occurred at the various premises.

Control processor 510 is connected to video server 102 through a communications port 512 so commands from the computer can be routed to the video server to control routing of video and audio signals from the video server to a workstation selected by the computer. The video, whether buffered or live, snapshots, thumbnails, or archival, is routed to a selected workstation over an ethernet. One of the functions of computer 104 is to monitor the availability of the various workstations at the central station so to provide an alarm indication and accompanying video, audio, and data to an available workstation. Further, commands from a system operator are sent back to a monitored site through the computer. A keyboard and associated display 514 enables an operator to also control operation of the computer to; for example, to purge memory 502. Finally, the central processor can route incoming and stored data to a printer interface 516 for recordation of the data in appropriate media.

Figure 15:
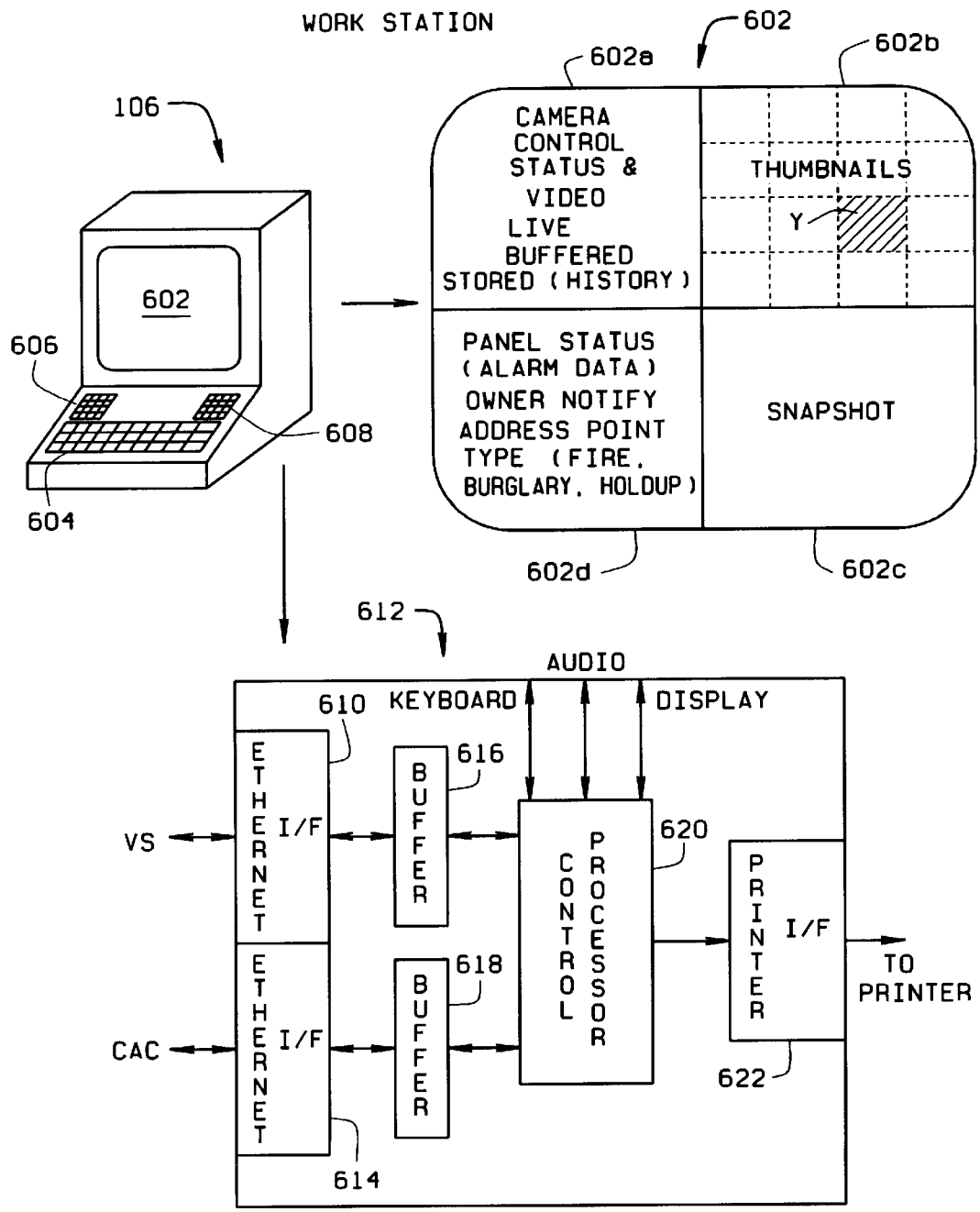

Workstation 106, as shown in FIG. 15, includes a video display 602, keyboard 604, speaker 606, and microphone 608. Display 602 is divided into four quadrants labelled 602a–602d. In quadrant 602a, status information for the cameras 22 at the premise is displayed. This includes information as to which camera is providing video from the site, for example. Information is also displayed in this portion of the screen as to the type of video being viewed; that is, is the video live, buffered, or stored or archival video.

In quadrant 602b, the operator has the ability to display up to sixteen thumbnails (i.e., the compressed frames of video shown in FIG. 4B). The operator can place these images in any order he wishes so to create a desired pattern or mosaic of the frames. The images displayed also can be not only current video, but stored video as well. This allows the operator to determine, for example, if an intruder has been previously detected on the premise (e.g., an employee, guard, etc.). As indicated at Y, the operator can highlight one of the thumbnails for which he wishes to see full frame video (a snapshot). The snapshot is then displayed in quadrant 602c. It will be understood that the thumbnails and snapshots are provided by, or through the video server using an ethernet connection between the video server and worstation as indicated at 610 of the control portion 612 of the workstation.

In the remaining quadrant 602d, relevant site data is displayed. This information is obtained through the central alarm computer and, again, can be both current and stored data. The workstation is connected to the CAC through a second and separate ethernet connection 614. Information displayed in quadrant 602d includes such information as:

who owns or operates the premise where the intrusion is detected;

the address of the premise;

who should be notified in the event of an alarm (both from the authorities and owner/operator personnel);

the type of alarm (intrusion, fire, burglary, holdup);

the point of the alarm.

For the latter, those skilled in the art understand that sensors such as S1–S3, are installed in sensing loops routed through the premise, and that a point represents a particular location in the premise served by a particular device or loop. Point identification information thus identifies that location for the operator.

Video, audio, and data routed to the workstation from the video server and CAC are respectively buffered as indicated at 616 and 618. The information is then routed to the display through a control processor 620. It will be understood that the transmission path is a two-way path so, for example, operator commands can be sent from the workstation, through the CAC, or VS, back to the SCU at the intrusion site. Or that video and audio information can be sent to the video server for storage in memory 402. Information which is to be printed, or of which a record is to be made, is routed from the control processor to a printer interface 622 for a record to be made in the appropriate media.

In transferring video between the SCU and VS, it is important that the transfer rate be controlled so there is not a backlog of video data created. That is, the transfer rate between the SCU and VS is maintained such that the VS can timely process the incoming information. One way of maintaining this control is for the VS to periodically transmit a data packet back through the communications channel between the two sites. The data packet is time coded. When the SCU receives the data packet, it returns it to the VS as part of the next data packet sent to the VS. When the VS receives the packet pack, it analyzes the transit time required for the trip. If the VS determines that the SCU is transmitting data at too slow a pace, it instructs the SCU to speed up its data delivery rate. Conversely, if the VS determines the SCU is transmitting data at too fast a rate, it commands the SCU to slow down its data delivery rate.

If data was transferred from the SCU to the TA faster than the communications line can accept it, then data would get backlogged into a buffer (not shown) of the TA. If for example, the TA's buffer contained 2 seconds worth of backlogged video, then the VS's data test packet would be delayed by 2 seconds while it went through the TA's buffer. The VS, noticing the 2 second additional delay, would be able to determine that 2 seconds worth of video had been backlogged in the TA's buffer and would command the SCU to slowdown. When the VS's data test packet is no longer received with any additional delays, then the VS commands the SCU to speed up. This "speedup" and "slowdown" process is continuous, resulting in maximizing the throughput of the communications line.

It is desired to playback video at the same speed it was recorded. In order to speedup and slowdown video, the following method is employed. Normal video is taken at a frame rate that maximizes throughput on the communications line, in this case video at 15 frames per second for the ISDN 128 kbps line. At the recording end (SCU) each frame would be transmitted with data indicating the number of milliseconds (hold time) that passed between the previous frame and this frame (67 msec for 15 fps). At the playback end (VS), the receiver reads the hold data and displays the previous frame for the stated hold time (number of milliseconds) indicated in the new, just received frame. When the SCU was commanded to slowdown, it could make a significant slowdown by changing to 14 fps—or a minor slowdown by just skipping updating one frame. This modified frame, which contains updated information for 2 normal time frames, would be transmitted with a hold time equal to twice the normal hold time (2×67=134 msec) so that the receiver would be able to hold the modified frame the exact amount of time needed to stay in sync with the created video. The resultant video would just have one frame of 'jerky' video every so often, and depending on the amount of movement in each scene—may not be very noticeable.

Figure 7:
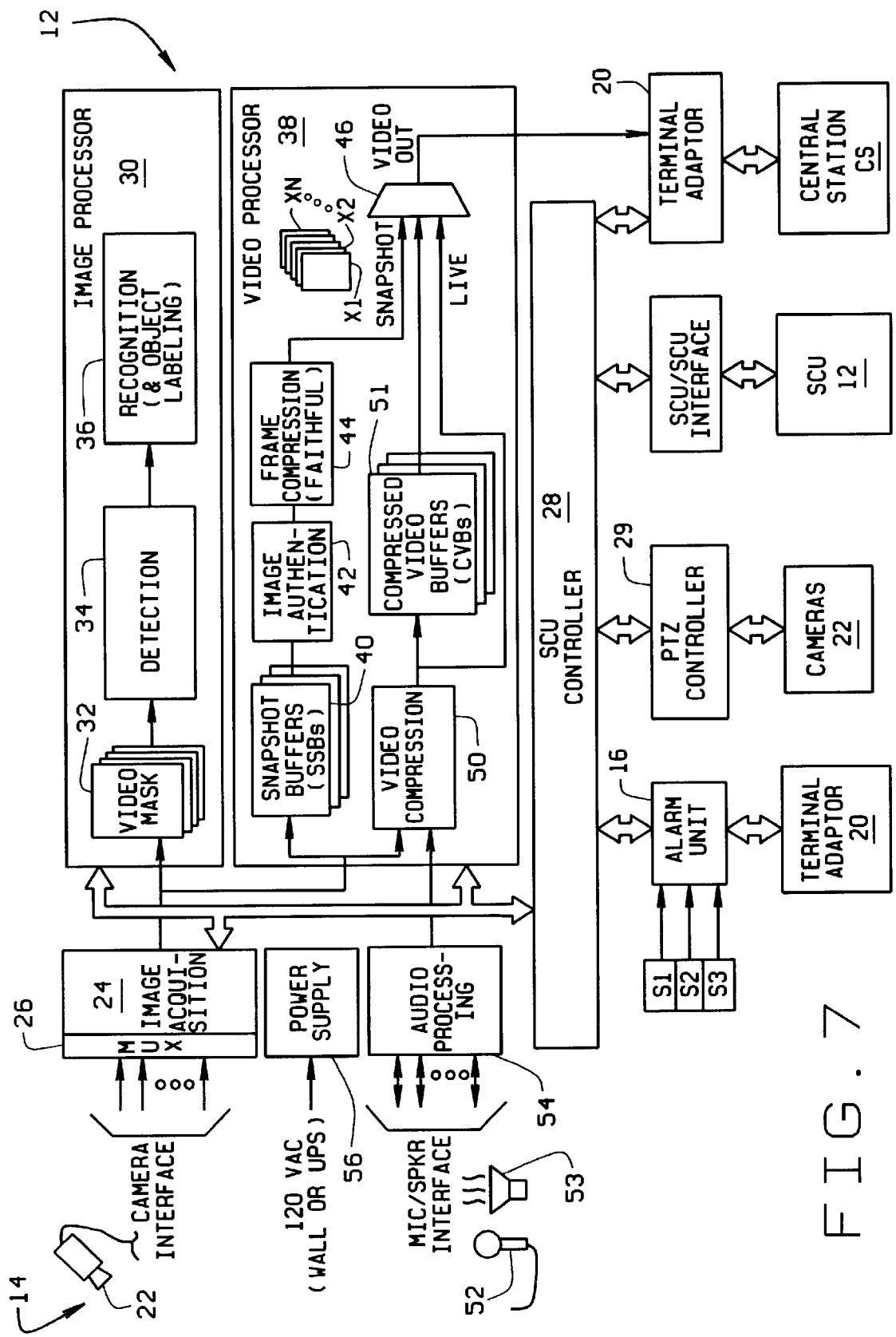
FIG. 7 is a block diagram of a site control unit installed on a premises.

As shown in FIG. 7, the images from cameras 22, in addition to being supplied to snapshot buffer 40 are also supplied to a video compression module 50. A compressed image, as shown in FIG. 8B, is made by taking, for example, every fourth pixel of a full frame image of FIG. 8A. Thus, a thumbnail has a pixel size of 128*120. Alternatively, rather than taking every fourth pixel, a thumbnail can also be created using pixel averaging techniques to create a thumbnail of the same 128*120 size. From module 50 compressed images are either sent directly (i.e., live) through video output 46 to the central station, or the compressed images are stored in a compressed video buffer 51 for subsequent transmission. When an intrusion is detected, video compression immediately begins, and the storage capacity of buffer 51 is sufficient to store several seconds of compressed video. The capacity of the buffer may be sufficient so that no images are lost between the time the intrusion is detected and a full bandwidth communications channel is established between the SCU and the central station. Live video is sent to the system control when, for example, the operator is doing a guard tour of the premise.

In addition to the video cameras 22, audio microphones 52 and speakers 53 may be employed about the premise. This allows for two-way communications through system 10 between the premise and central station. The cameras 22 may incorporate the microphones and speakers, or the microphones and speakers may be separately installed. Audio received by the microphones is processed by an audio processing module 54 of the SCU. Audio output signals from the processing are supplied to video compression module 50 for the audio to be compressed. The compressed video signals from the SCU are then transmitted to the system control with interlaced compressed audio, thus enabling the operator to also listen in on an intrusion as well as view it. Audio signals from the central station to the premise flow in the opposite direction.

Once a communications path is established between the SCU and the central station, the operator can now control a number of facets of the SCU operation. Besides control of the snapshots, the operator can override a particular camera from which the video is being compressed and relayed to him select stored (if available) or live video from that camera, or have the same control capabilities, but from another camera. This is particularly useful when there may be more than one intrusion detected and the first detection is from an area of the premises having less priority than that where there is another detection. By being able to observe the other scene, the operator can use the SCU to monitor the detection of the intruder in the higher priority area. Again, the operator can use the pan, tilt and zoom capabilities of a camera to help him obtain better observe the scene. The operator can also control operation of processor 30, through controller 28. so the processor can be commanded to not process video images from a particular camera at a particular time. Finally, there a number other features concerning system 10 which are important for the overall operation and performance of the system. First, various of the sensors S1–S3 operated or controlled by the AU to provide both a DELAYED mode, as well as in an INSTANT mode, of alarm sensing. An example of the DELAYED mode is the situation referred to above where, even though a sensor senses an intrusion (sensor S2 senses a door opening), nothing will happen for predetermined period of time. Thus, if the entrant enters a correct code at panel P, the person is authorized and this is not an actual alarm condition. If no correct entry is made before the period expires; then, at the expiration of the time interval, an alarm is given. If, however, sensor S1 senses a window opening, the alarm is instant because no one, even an authorized person, is expected to enter the premise through a window. As described earlier, camera 22 in conjunction with SCU 12 can be viewed as a sensor. As a sensor, the AU can control the transmission of the Alarm and Video to the CS. Using FIG. 2 as an example, a camera 22 is located in a lobby, so that it can view someone entering a building through the main entrance door D protected with a sensor S2. This camera sensor is programmed at the AU 16 as DELAYED. Consider the following scenario: first, an authorized person opens the door D in the morning. Sensor S2 causes an alarm upon the door opening, and the AU begins an "Entrance Delay". Next, camera 22 detects the intrusion as the person enters the lobby, SCU 12 processes the resulting video image, stores snapshots X and compressed video, and sends an alarm to the AU. The person goes to the control keypad P and enters an acceptable password, turning off the protection. The AU discards both alarms and commands the SCU to disarm camera 22.

If, however, the person was not authorized—or did not know an acceptable password—then the AU would delay for a predetermined time (usually 60 seconds). When the delay expires: the AU would transmit an alarm condition to the central station via TA 20, and command the SCU to transmit its stored video to the central station, also via TA 20. At the central station, the operator receive the alarm conditions of both the door and the camera; views the video of the person entering the door; is able to retrieve one or more of the stored snapshots of the entry; as well as control the same or a different camera transmitting live video from various locations within the premise; and finally, notifies the appropriate authorities of the alarm condition.

Second, the AU can be used to simplify the testing of the video cameras and the SCU. Trying to test video cameras and a system such as the SCU, can be difficult, take a significant amount of time and technical expertise, and sometimes require more than one person to perform the test. As stated earlier, the camera and SCU can be considered as a camera sensor, they can be tested by the AU like any other sensor in what is normally referred to as a "Walk test". Someone at the premise requests a "Walk test" of the camera at the AU. In response, the AU will command the SCU to arm the camera (note that the SCU is not aware that this is a test and will respond to any intrusion as if it was an alarm). Next, the person walks in front of the camera and then returns to the AU. The AU will indicate that an alarm condition was received from the SCU for that camera. Shutting off the "Walk test" causes the AU to command the SCU to disarm the camera. Basically, a functional test of the camera, SCU, and AU have been completed. As should be evident, the skill level needed to perform this test, and the time necessary to complete it are both minimal. Implementing the walk test for all of the cameras on the system is no more difficult. The "Walk test" is requested of all of the cameras; the person walks in front of each camera, one at a time; then returns to the AU which identifies which cameras reported alarms and which cameras did not. It's that simple.

Since, during the life of the system, the cameras may never see an actual intrusion and no one would ever know if the system would work, it is important to he able to perform a fully functional test like this. Even more important is that it be simple enough that basically anyone would be able to perform the test. If it is simple, the chance of it being actually performed is greater.

Adding a final level of testing of the entire system is also possible. An additional communication from the AU to the Central Station CAC via the TA would be necessary to notify the CAC that a test was going to be performed. The AU would then wait for a response from the CAC indicating that the VS received alarm video from the SCU, and finally the AU would report locally that the test was completed successfully.

Third, for a premise having guards on duty during a portion of the day or week, when the guard goes off duty, he can request a "hand-off" with the system. The guard does this by contacting the central station through the AU and requesting that control of the monitoring function be taken over by the system. The AU sends a transfer request to the CAC. The CAC, either directly, or through the AU, requests the SCU to transmit test data to the central station. If the data is received and verified by the CAC and VS, then the CAC authorizes the "hand-off" and the guard can go off duty. Otherwise, the system attempts to locate any problem, and the guard is kept on duty until the problem is found and fixed.

What has been described is a video security system in which a system control for the security system may either be local to, or remote from, a site control unit which performs on-site image processing and recognition and confirmation of intrusions. A SCU can accommodate a plurality of cameras which can be color, black and white, analog or digital cameras. The cameras have pan, tilt, and zoom capabilities and the cameras can operate at up to 15 frames per second or variable rate of high resolution video. Two-way audio communications can also be employed at the facility and acquired audio is interleaved with processed video to provide a system operator both visual and audio monitoring capabilities. It is a particular feature of the security system that the camera and SCU together comprise a motion detector which provides an input to the AU in much the same manner as the other sensors monitored by the AU. However, the only time this new motion sensor provides an alarm indication to the AU is after it has not only detected motion, but also confirmed the cause of the one as being from a selected identifiable class, or an unknown source.

It is a particular feature of the video security system to process acquired video so as to detect actual intrusions of the premises and inform a system operator of such an event; while not giving false or unwanted alarms to the operator.

When an intrusion is detected, full resolution snapshots of the intrusion are transmitted to the central station for viewing by the operator, as well as providing the operator compressed video images, live video, and audio. The operator can remotely select snapshots for viewing and can create a mosaic of snapshots for review. The snapshots are authenticated both at the SCU and the central station, and all the snapshots are stored can be stored if so desired. By not requiring a system operator to confirm an intrusion; but rather, by confirming first, then alerting the operator, the operator's time is more efficiently used.

The system operator can perform a remote guard tour of the premises using the SCU and the cameras. The system can also be walk tested to insure its operational status, and a "hand-off" protocol is employed to transfer monitoring responsibilities from guards at the premise to the system.

As complex as the system is, it can be tested simply by walking in front of a camera.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A security system monitoring a premise to detect intrusions onto the premise comprising:

means acquiring sequential multiple video images of a scene of the premise, a processor processing said images to compare said video images to determine differences in said video images of said scene, to classify the cause of said differences based on physical characteristics of an object causing the differences, and to provide an indication only if said source is classified as movement of a predetermined class; and, an alarm unit responsive to said indication to provide an alarm.

2. The security system of claim 1 which simultaneously monitors a number of premises.

3. The security system of claim 1 wherein said processor is responsive to said alarm unit to transmit a video image of a scene in which motion is detected, and the system includes a video server for receiving said video image.

4. The security system of claim 3 wherein said processor authenticates each video image transmitted to said video server, and said video server verifying the authentication of each video image received to verify that the video image received is identical to the video image transmitted.

5. The security system of claim 3 further including video display means connected to said video server for observing said video image.

6. The security system of claim 1 further including a plurality of video display means and an alarm computer for selecting at which display means the video image is observed.

7. The security system of claim 6 wherein said processor transmits sequential multiple video images to a video server for display on said video display means, said processor transmitting said video images only when an indication is made where said source is classified as movement of a predetermined class, or transmitting said video images only when a user directs said processor to transmit said video images.

8. The security system of claim 7 wherein said video images may be selectively displayed on the video display means and whereby said video images can be displayed in a mosaic pattern.

9. The security system of claim 8 wherein said alarm computer includes means for storing and retrieving non-video data relevant to and indicating characteristics of said premise from which said video images are transmitted, and said alarm computer displays said data on said video display means together with said video images.

10. The security system of claim 1 further including sensors connected to said alarm unit, said sensors sensing the condition of the premise, said alarm unit being further responsive to a indication of an intrusion from one of said sensors for further providing an alarm.

11. The security system of claim 10 further including a communication means connected to said processor and a video server, and a terminal adapter being responsive to a signal from said alarm unit to route video images transmitted by said processor to said video server.

12. The security system of claim 1 wherein said means acquiring said image includes a plurality of video cameras located about said premise.

13. The security system of claim 12 further including audio acquisition means for acquiring audio inputs from about said premise, said processor processing said audio inputs together with said video image.

14. The security system of claim 10 wherein said alarm unit is responsive to inputs from said sensors to provide an alarm indication on either an instant or a delayed basis, and said alarm means is responsive to said indication from said processor to also provide said alarm indication on an instant or delayed basis.

15. The security system of claim 11 wherein said video server includes an image transfer means controlling said processor to direct the rate at which said processor transmits video images to said video server.

16. The security system of claim 15 wherein said image transfer means controls the rate at which the processor transmits video images, said image transfer means calculating the rate at which said processor and said video server accept data by transmitting a data packet to said processor, said processor returning said data packet to said video server, and said image transfer means determining the amount of time required for the data packet to be sent to processor and return, and wherein said image transfer means directs the processor to transmit video images at said rate.

17. The security system of claim 11 further including control means by which an operator of said system can selectively operate each of said cameras to view a scene of the premise observed by each individual camera, said control means allowing said operator to thereby tour said premise from a remote site.

18. The security system of claim 17 wherein said control means further allows said operator to suspend operation of said processor to process a video image obtained from any of said cameras, and whereby said operator can suspend processor operation during said tour, or during a test of said system to determine if the system is operating properly.

19. The security system of claim 18 wherein said control means further enables testing of said system prior to the transfer of monitoring of the premise from on-premise guard personnel to the security system.

20. The security system of claim 6 further including a plurality of workstations each of which includes a video display means, said video display means including a monitor simultaneously displaying a plurality of video images and non-video data relevant to and indicating characteristics of said premise from which the video images were transmitted.

21. A security system comprising a motion detector and an alarm unit responsive to an output from said motion detector to provide an alarm, said motion detector acquiring a video image of a scene and processing said video image to detect motion in said scene and classify the cause of said motion based upon size and shape characteristics of a body causing the motion, said motion detector providing an output to said alarm unit only when the motion detector has confirmed that the cause of said motion is one of a class of predetermined causes.

22. The security system of claim 21 wherein said motion detector further provides an output to said alarm unit when said motion detector classifies the cause of said motion as unknown.

23. The security system of claim 22 wherein said alarm unit is responsive to an output from said motion detector immediately when said output is received, or on a time delayed basis.

* * * * *

UNITED STATES PATENT AND TRADEMARK OFFICE
CERTIFICATE OF CORRECTION

PATENT NO : 6,069,655
DATED : May 30, 2000
INVENTOR(S) : Seeley, et al.

It is certified that error appears in the above-identified patent and that said Letters Patent is hereby corrected as shown below:

Col. 13, Line 5
  Replace "To" and "Fn" with "$T_o$" and "$F_n$"

Signed and Sealed this

Twentieth Day of March, 2001

Attest:

NICHOLAS P. GODICI

Attesting Officer    Acting Director of the United States Patent and Trademark Office